United States Patent Office 3,504,798
Patented Apr. 7, 1970

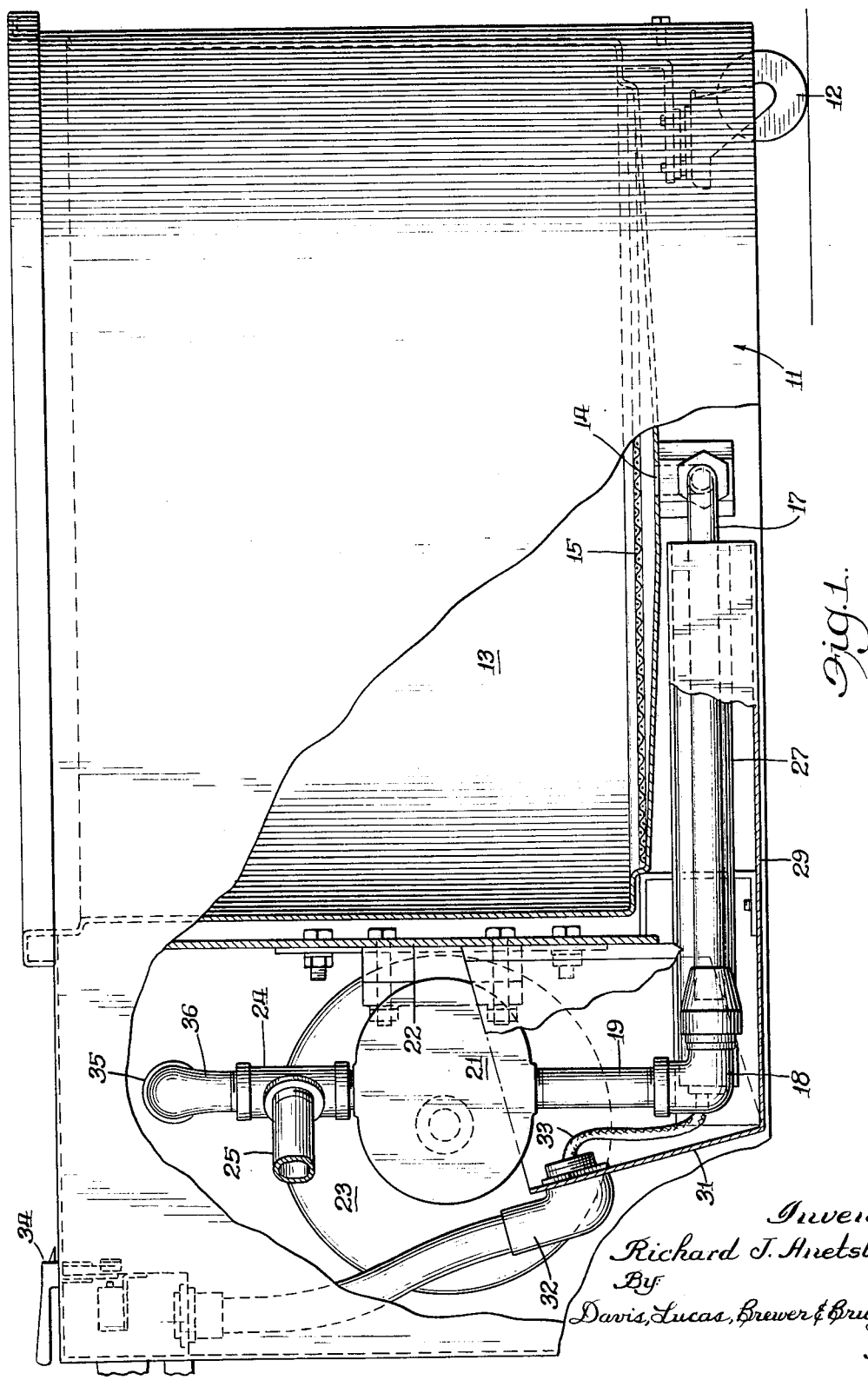

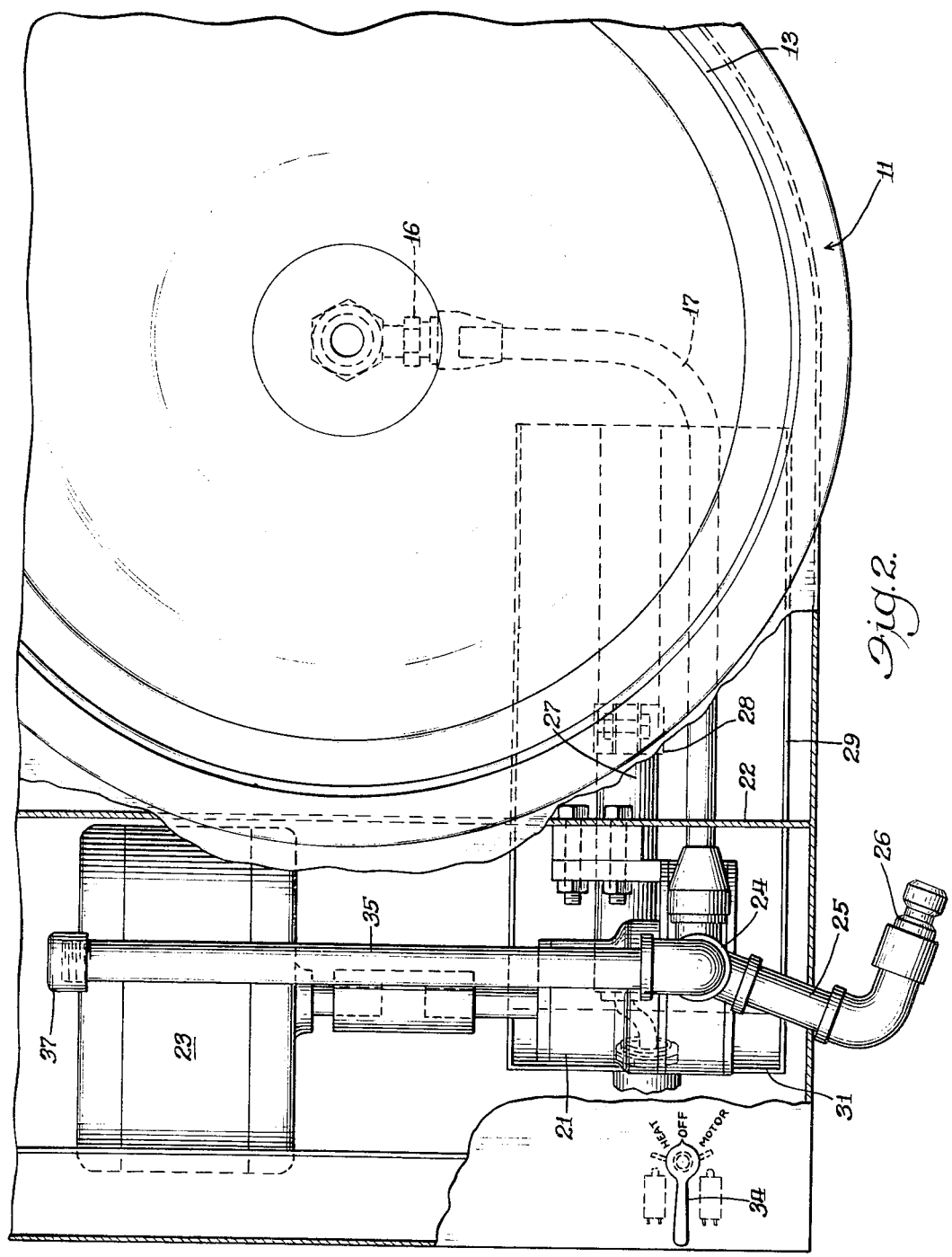

3,504,798
FILTER
Richard J. Anetsberger, Northbrook, Ill., assignor to Anetsberger Brothers, Inc., Northbrook, Ill., a corporation of Illinois
Filed June 4, 1968, Ser. No. 734,434
Int. Cl. B01d 23/20, 29/42, 35/18
U.S. Cl. 210—181                                              3 Claims

ABSTRACT OF THE DISCLOSURE

Vacuum filter for extremely hot liquid cooking fat comprising a container for the liquid with filter means and an outlet at the bottom, a pump inlet conduit extending from the container outlet to a simple gear pump operable to draw liquid through the filter means and discharge the same through an outlet conduit connected to the discharge side of the pump, and pulse-suppressing means to insure smooth-flowing discharge of the liquid in the form of a closed-end pipe of substantial length connected with the outlet conduit directly adjacent the discharge side of the pump, with an electric heating heating cartridge mounted adjacent the pump inlet conduit and a metal shroud surrounding it for directing heated ambient air against the pump, and a double-throw switch for controlling operation of pump and cartridge, whereby the cartridge may be selectively energized to melt congealed residual cooking fat to permit operation of the pump and thus eliminate the necessity of providing any arrangement for manually draining the pump and adjacent conduits after each filtering operation.

BACKGROUND OF THE INVENTION

Field of the invention

This invention relates generally to filters, and more particularly to vacuum filters for removing foreign particles from extremely hot liquid cooking fat.

Description of the prior art

Filters of this type provided with an open top container for the hot liquid to be filtered and pump means for pulling that liquid through an outlet in the bottom of the container and a filter element in the form of a thin disk of paper, or the like, supported slightly above the bottom of the container and discharging the hot filtered liquid from an outlet conduit connected to the discharge side of the pump are disclosed in U.S. Letters Patent No. 2,477,404, issued July 26, 1949 and No. 3,337,055, dated Aug. 27, 1967. The use of the simplest and most inexpensive gear pump in such a filter would be highly desirable, but it has been found that pulsing or spitting of the hot liquid from the discharge conduit may occur when such a pump is used and this is intolerable, particularly because of the temperature of the liquid being in the neighborhood of 300° F. The use of a pump incorporating a by-pass in its construction eliminates such spitting of the hot liquid from the discharge conduit, but this comprises an expensive solution to the problem.

Another problem with this type of filter is the accumulation of residual cookng liquid in the pump and connecting conduits after a filtering operation which will congeal or solidify to render the pump inoperative. A solution to this problem is to provide drain means manually operable after a filtering operation to remove any residual liquid, such as that disclosed in No. 3,337,055. But this is a messy operation and requires the use of another container to receive the hot residual liquid.

SUMMARY OF THE INVENTION

The present invention solves each of these problems. To prevent any spitting of the hot filtered liquid from the discharge conduit while employing only a simple gear pump driven by an electric motor, this invention includes a pulse-suppressing means in such a filter comprising a closed-end pipe of substantial length connected with the discharge conduit directly adjacent the outlet side of the pump. Instead of requiring and providing for drainage and removal of hot residual liquid after each filtering operation, a heating means is incorporated in such a filter which is selectively operable to melt congealed residual cooking fat that otherwise might render the pump inoperative. In the specific embodiment illustrated, this heating means comprises a cartridge-type electric heater mounted adjacent the conduit extending from the liquid container to the pump, and includes a shroud surrounding it and directing air heated thereby into contact with the pump, as well as control means selectively manually operable to effect energization of either the heating means or the pump motor.

In the drawings:

FIGURE 1 is a side elevational view of a filter embodying the features of this invention, with parts broken away and shown in part in vertical section; and FIG. 2 is a top plan view of a portion of the filter of FIG. 1 with parts broken away to expose the pump and related mechanism.

DESCRIPTION OF THE PREFERRED EMBODIMENT

Referring more particularly to the drawings, reference numeral 11 indicates in general a vacuum filter unit comprising an outer housing of any suitable construction supported by casters 12, or the like, to render the same readily mobile and including a container or bowl 13 for receiving extremely hot liquid cooking fat to be filtered. To this end, the container 13 is open at the top and is provided at the bottom with a suitable outlet 14, filter means 15 being disposed in well-known manner in the lower portion of the container and spaced slightly above the bottom thereof. This filter means 15 normally comprises a filter disk of paper, or the like, on the upper surface of which foreign particles in the liquid to be filtered are deposited as that liquid is drawn through the filter.

The container outlet 14 is connected by means of a suitable fitting 16 to one end of a horizontally disposed pump inlet conduit 17 which, as best seen in FIG. 2, extends radially from the outlet 14 to a point short of the periphery of the container 13 and then at substantially right angles thereto toward one end of the filter unit to a point somewhat beyond the periphery of the liquid container. This inlet conduit 17 also includes a fitting 18 of well-known construction (FIG. 1) for connecting its outer end to a vertical portion 19 which is connected at its upper end to the inlet side of a simple gear pump 21 mounted in any suitable manner interiorly of the unit, as by means of an interior vertical wall 22. This pump 21 is driven or adapted to be rotated by an electric motor 23. The outlet side of the pump 21 is connected in well-known manner by a T-fitting 24 to one end of a discharge conduit 25. The other end of the discharge conduit 25, is shown in FIG. 2, is provided with a suitable fitting 26 for connection to a flexible hose, or the like, as in the manner of the prior patents hereinbefore identified.

Mounted beneath the container 13 and preferably parallel to the longer, outer arm of the conduit 17 is a cartridge-type electric heater 27. This heater means 27 extends beyond the container 13 and under the vertical wall 22 and is removably mounted in any desired manner, as by means of a well-known clip or clamping means 28 shown in FIG. 2. Surrounding the cartridge heater 27 and the adjacent parallel portion of the pump inlet conduit 17 is a shroud 29 open at both ends, preferably formed of sheet metal and mounted in any suitable manner. At the outer end, this shroud 29 terminates in an upwardly directed portion 31 which supports the lower end of a wire conduit 32 through which an electric cable 33 (FIG. 1) extends for detachable connection to the cartridge heater 27 in well-known manner.

The electric cable 33 is connected through a double-throw switch 34 to a suitable source of electrical energy. The motor 23 also is connected through this switch 34 to the source of electrical energy, it being understood that the switch thus comprises selectively operable control means to effect connection of the source of energy either to the heating means 27 or the motor 23.

Novel pulse-suppressing means to insure smooth-flowing discharge of the hot liquid from the outlet conduit is provided which comprises a closed-end pipe 35 of substantial length connected at its inner end by a suitable vertically extending portion 36 to the T-fitting 24 directly adjacent the discharge side of the pump 21. As best seen in FIG. 2, the major portion of the pipe 35 is substantially horizontally disposed and the outer end thereof is closed by means of a suitable cap 37. In the illustrated embodiment of the invention, this closed-end pipe 35 preferably is between ten and twelve inches long, and it has been found that when three-eighths of an inch pipe is employed for this purpose, a minimum length of six inches which provides a minimum interior volume of approximately 0.88 cubic inch is essential to proper operation and to assure the desired pulse-suppressing effect.

Of peculiar interest is the fact that use of such a closed-end pipe below the indicated minimum dimensions, or elimination thereof as by closing the upper end of the T-fitting 24, invariably results in the development of a pulse during a pumping operation in filtering foreign particles from cooking liquid that has been placed in the container 13 to cause serious spitting of the hot liquid at the discharge end of the conduit 25. Such pulsing and spitting may be the result of accumulations of foreign particles on the filter means 15 during such a filtering operation. Whatever the cause, use of the closed-end pipe herein disclosed completely eliminates any such pulsing and spitting. The importance of this is emphasized by the fact that the cooking fat being filtered normally will have a temperature in the neighborhood of 300° F.

After a filtering operation has been performed, it is not necessary to drain or otherwise remove excess or residual hot liquid from the conduits 17, 25 and pump 21 which, as previously noted, would require the use of some additional receptacle. Instead, the residual liquid is permitted to remain in those conduits and the pump and even if the filter is not again used before that residual liquid congeals to render the pump inoperative, this condition quickly may be rectified by energizing the heater means 27. This results in quickly heating the pump inlet conduit 17 and the pump, the ambient air within the shroud 29 being directed upwardly by the outer end portion 31 of the shroud into contact with the pump and the lower portion of the discharge conduit 25. This may be effected by selective movement of the switch 34 from its normal off position of FIG. 2 in a clockwise direction to cause energization of the heater. As soon as the residual fat has been melted in response to such energizing of the heater means, another filtering operation may be instituted by energizing the motor 23 in response to counter-clockwise movement of the switch 34, as viewed in FIG. 2. The switch 34 thus functions as an interlock to prevent simultaneous energization of the motor and the heating means and has been so included to prevent carelessly leaving the heater on, as during a filtering operation or after the same has been completed. It will be appreciated that the heating means 27 is intended to be used only before a filtering operation which follows a previous use of the filter by a lapse of time sufficient to result in congealing of the residual cooking liquid. Upon completion of a filtering operation, the pump motor naturally will be de-energized, and movement of switch 34 to accomplish this will not cause energization of the heater 27. This is of particular importance in preventing careless leaving of the heater energized overnight, since most commercial establishments using deep fat fryers, and the like, customarily filter the cooking fat at the end of a day's run. In connection with the use of the control switch 34, it should be noted that the same may be mounted at any convenient location other than that illustrated, such as on the nozzle normally employed on the flexible hose described as connected to the fitting 26, if desired.

It is thought that the invention and many of the attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

What is claimed is:

1. A vacuum filter for extremely hot liquid cooking fat, comprising a container for liquid to be filtered with an open top and an outlet at the bottom thereof and filter means therein adjacent said outlet for removing and collecting foreign particles from the liquid as it passes therethrough, a pump for drawing liquid from said container through said filter means and outlet, a pump inlet conduit interconnecting said container outlet and the inlet side of said pump, a pump outlet conduit connected to the discharge side of said pump and having a free end disposed exteriorly of said container, pulse-suppressing means to insure smooth-flowing discharge of the hot liquid from said outlet conduit comprising a closed-end pipe of substantial length connected with said outlet conduit directly adjacent said discharge side of said pump and disposed entirely substantially below the top of said container heating means adjacent said pump inlet conduit selectively operable manualy to melt residual cooking fat contained therein, and shroud means surrounding said heating means, said shroud means being so constructed and arranged to transfer heat from the heating means to said pump to melt residual cooking fat congealed therein to permit operation of said pump.

2. In a filter according to claim 1, a motor for operating said pump, a source of electric energy for said motor and said heating means, and control means selectively operable manually to connect said source of energy either to said heating means or said motor.

3. A filter according to claim 2, wherein said control means comprises a double-throw switch mounted for convenient manual operation.

References Cited

UNITED STATES PATENTS

| 1,843,157 | 2/1932 | Howe | 210—167 |
| 2,072,403 | 3/1937 | Lausen | 137—207 X |
| 2,337,893 | 12/1943 | Hutterer | 210—181 |
| 2,477,404 | 7/1949 | Butt. | |
| 2,698,092 | 12/1954 | Morton. | |
| 2,799,289 | 7/1957 | Mustee | 137—207 |
| 3,107,601 | 10/1963 | Longmire. | |
| 3,263,818 | 8/1966 | Gedrich | 210—167 X |
| 3,292,661 | 12/1966 | Everett | 137—207 X |
| 3,337,055 | 8/1967 | Starnes et al. | |

REUBEN FRIEDMAN, Primary Examiner

C. M. DITLOW III, Assistant Examiner

U.S. Cl. X.R.

210—184, 349, 416